United States Patent [19]
Tamai

[11] 3,850,631
[45] Nov. 26, 1974

[54] PHOTOCONDUCTIVE ELEMENT WITH A POLYVINYLIDENE FLUORIDE BINDER

[75] Inventor: Yasuo Tamai, Tokyo, Japan

[73] Assignee: Rank Xerox, Ltd., London, England

[22] Filed: Apr. 24, 1973

[21] Appl. No.: 354,058

[52] U.S. Cl............... 96/1.5, 96/1.8, 117/34, 117/161 R, 117/161 UZ, 117/64 R
[51] Int. Cl.............................................. G03g 5/04
[58] Field of Search ............... 96/1.5, 1.8; 117/34

[56] References Cited
UNITED STATES PATENTS

| | | | |
|---|---|---|---|
| 3,159,483 | 12/1964 | Behmenburg et al.............. | 96/1.5 |
| 3,376,134 | 4/1968 | Stahly et al...................... | 96/1.5 X |
| 3,573,906 | 4/1971 | Goffe.............................. | 96/1.8 |
| 3,652,269 | 3/1972 | Contois et al.................... | 96/1.5 |

Primary Examiner—Roland E. Martin, Jr.

[57] ABSTRACT

An improved electrophotographic imaging member is provided which comprises a photoconductive powder-polyvinylidene fluoride resin material. A liquid dispersion of a photoconductive powder and polyvinylidene fluoride resin is applied to a suitable substrate material and dried. The substrate thus coated is then heat treated at a temperature higher than the softening point and lower than the decomposition point of polyvinylidene fluoride for a suitable period of time and then slowly cooled. Once cooled, the surface of the imaging member may be polished to improve its charge acceptance. Electrophotographic imaging processes employing this member are also disclosed.

7 Claims, No Drawings

PHOTOCONDUCTIVE ELEMENT WITH A POLYVINYLIDENE FLUORIDE BINDER

BACKGROUND OF THE INVENTION

This invention relates to electrophotography and more specifically to a novel method for providing sensitive electrophotographic plates for use in electrophotography. In the well-known art of electrophotography, more commonly referred to as xerography, a photoconductive member is charged, selectively exposed, and then developed with electroscopic marking material referred to in the art as "toner" to provide a visible reproduction of an original. The image thus provided may be transferred to an image receiving member or otherwise utilized. Further, in order to maintain the integrity of the image produced, the image however utilized may be fixed employing any suitable technique such as, for example, application of heat or a suitable solvent vapor. Amorphous selenium or selenium type alloys are popularly employed in xerography as photoconductors. However, these selenium photoconductors, despite their universal acceptance and use in the field of electrophotographic imaging, have certain disadvantages, to wit: poor heat resistance and the susceptibility to suffer deterioration of their properties when exposed to heat. In addition, wear resistance is sometimes found to be a problem when employing selenium photoconductors, and it is not uncommon after some use in an electrophotographic imaging mode to observe flaws or cuts on the surface of a selenium photoconductor. There is, therefore, a demonstrated need to provide improved photoconductive materials for use in xerography.

It is, therefore, an object of this invention to provide a system which produces photoconductive materials devoid of the above noted deficiencies.

It is another object of this invention to provide a novel method for producing sensitive electrophotographic plates.

Again, another object of this invention is to provide electrophotographic plates exhibiting excellent mechanical toughness.

It is a further object of this invention to provide novel electrophotographic plates which exhibit excellent thermal stability.

Yet, again another object of this invention is to provide novel electrophotographic plates which are highly resistant to chemical corrosion.

Yet, again another object of this invention is to provide a novel electrophotographic plate which exhibits superior physical properties in addition to possessing a high degree of electrophotographic sensitivity.

These and other objects of the instant invention are accomplished, generally speaking, by providing an improved photoconductive powder-polyvinylidene fluoride resin material. Thus, for example, a liquid dispersion of a photoconductive powder and polyvinylidene fluoride resin is applied to a suitable substrate material and dried. The plate so provided is then heat treated at a temperature higher than the softening point and lower than the decomposition point of polyvinylidene fluoride for a suitable period of time. After heat treatment, the plate is slowly cooled and then the surface thereof is polished to improve its charge acceptance. The resulting electrophotographic plate is then charged, selectively exposed, and developed employing conventional xerographic techniques.

Although it is known that polyvinylidene fluoride resin has a superior mechanical properties such as toughness and excellent thermal stability, in addition to being highly resistant against corrosion by various organic and inorganic chemical agents or solvents, the resin has demonstrated a disadvantage of being insoluble to most organic solvents. This has lead to practically an insurmountable obstacle in the effective utilization of this resin as a bonding agent for photoconductors. For example, an electrophotographic sensitive layer which has been prepared by dissolving polyvinylidene fluoride resin in the form of a colloidal solution in dimethylacetoamide or the like, mixing zinc oxide in the solution, and then applying the mixture on electroconductive base and drying same proves to be defective or substantially deficient in electrostatic properties in order to function as an electrophotographic plate. Now, in accordance with the system of the instant invention, electrophotographic plates having excellent physical properties may be obtained employing polyvinylidene fluoride resins by, for example, mixing a photoconductive powder, such as zinc oxide, with fine grains of polyvinylidene fluoride resin in a suitable solvent; applying the mixture to a suitable substrate, for example, a heat resistant electroconductive base, then, after drying, subjecting the base to heat treatment at a temperature higher than the softening point and lower than the decomposition point of polyvinylidene fluoride. In order to improve the charge acceptance of the member provided, it is preferable to polish the resulting electrophotographic member to substantially increase the charge acceptance.

As above stated, it has been found that the electrophotographic properties of the plate provided may be remarkably improved by polishing the surface of the plate after heat treatment. After polishing the surface of the electrophotographic member, the surface potential of the plate can be increased from 10 to 1,000 times as high as that before polishing. Such surface polishing may be accomplished employing any suitable method, for example, employing a polishing sheet, wire brush, or the like. So called "puffing" of the surface after polishing is also effective for eliminating small imperfections or irregularities of the surfaces.

Any suitable inorganic or organic photoconductor may be employed in the system of the instant invention. Typical organic photoconductors include: triphenylamine; 2,4-bis(4,4'-diethyl-aminophenyl)-1,3,4-oxadiazol; N-isopropylcarbazole triphenylpyrrol; 4,5-diphenyl-imidazolidinone; 4,5-diphenyl-imidazolidinethione; 4,5-bis-(4'-amino-phenyl)-imidazolidinone; 1,5-dicyanonaphthalene, 1,4-dicyanonaphthalene; aminophthalodinitrile; nitrophthalodinitrile; 1,2,5,6-tetraaza-N-isopropylcarbazole triphenylpyrrol; 4,5-diphenylimidazolidinone; 4,5-diphenylimidazolidinethion; 4,5-bis-(4'-aminophenyl)-imidazolidione; 1,5-dicyanonaphthalene; 1,4-dicyanonaphthalene; aminophthalodinitrile; nitrophthalodinitrile; 1,2,5,6-tetraazacyclooctatetraene-(2,4,6,8); 2-mercapto-benzthiazole; 2-phenyl-4-diphenylidene-oxazolone; 6-hydroxy-2,3-di(p-methoxy-phenyl)-benzofurane; 4dimethyl-amino benzylidene-benzhydrazide; 3-benzylidene-amino-carbazole; polyvinyl carbazole; (2-nitrobenzylidene)-p-bromo-aniline; 2,3-diphenyl quinazoline; 1,2,4-triazine; 1,5-diphenyl-3-methyl-pyrazoline; 2-(4'-dimethylaminophenyl)-benzoxazole; 3-aminocarbazole; phthalocyanines; trinitrofluorenone-polyvinylcarbazole charge transfer complexes, and mixtures thereof.

Typical inorganic photoconductors include: sulfur, selenium, zinc sulfide, zinc oxide, zinc cadmium sulfide, zinc magnesium oxide, cadmium selenide, zinc silicate, calciumstrontium sulfide, cadmium sulfide, indium trisulfide, gallium triselenide, arsenic disulfide, arsenic trisulfide, arsenic triselenide, antimony trisulfide, cadmium sulfo-selenide, and mixtures thereof. Of these zinc oxide, cadmium sulfide, zinc sulfide, cadmium sulfide-cadmium carbonate ink complexes either alone or in combination are preferred.

Any suitable solvent for polyvinylidene fluoride may be employed in the system of the instant invention. Preferred solvents include: dimethylacetoamide or dimethylsulfoxide. Other typical solvents which polyvinylidene fluoride is not particularly soluble in may also be employed, such as methanol, acetone or diisobutyl ketone. However, in this instance, it is desirable that the grains of polyvinylidene fluoride resin employed have an average grain size of less than 10 microns, preferably less than 5. The polyvinylidene fluoride employed should have an average molecular weight within the range of from about 50,000 to about one million so as to provide an electrophotographic plate having the desired characteristics.

Any suitable electroconductive base may be employed in the system of the instant invention. The base employed in the system of the instant invention may be prepared by employing various types of metal plates or metal cylinders having a melting point of higher than about 400°C. It is also possible to employ glass which has been treated to improve its electroconductivity. Typical conductive base materials include: aluminum, iron, copper, aluminized steel, stainless steel, brass, and the like.

Any suitable temperature may be employed in the heat treatment step of the system of the instant invention. As hereinbefore generally described, the coated electroconductive plate should be dried prior to heat treatment, since without prior drying, cracks or burns may be produced in the sensitive layer because of the presence of low boiling point solvent. The heat treatment is conducted at a temperature higher than the softening point and lower than the decomposition point of polyvinylidene fluoride. Experiments have shown that a temperature of from about 190°C to about 320° and a heating time of from about 5 minutes to about 2 hours yields satisfactory results. Heat treating the base below about 190°C results in a materail which has less mechanical strength than when heated to higher levels; while heating higher than about 320°C generally results in a decomposition of polyvinylidene fluoride.

After the heat treatment, the plate is cooled employing any suitable cooling method. Most commonly the plate is just allowed to cool in atmosphere. However, this process may be accelerated by the application of external methods of heat removal, for example, the application of cool air, employing a refrigerating environment, etc.

Any suitable ratio of polyvinylidene fluoride to photoconductive powder may be employed in the system of the instant invention. It is preferred to obtain optimum results to employ a ratio of photoconductive powder to polyvinylidene fluoride resin of from about 2:1 to about 6:1. It is found that if the amount of resin is more than the above stated ratio, photoconductivity is found to diminish; while, if the amount of the photoconductive powder is more than said ratio, mechanical strength is found to diminish.

Any suitable method of charging may be employed in the system of the instant invention. Typical methods include: corona charging, charge deposition resulting from air breakdown in the gap commonly referred to as TESI, or charging in vacuo with an electron gun.

Any suitable method of exposure may be employed in the system of the instant invention. Typical methods include: reflex, contact, holographic techniques, non-lens slit scanning systems, and optical projection systems involving lens imaging of opaque-reflection subjects as well as transparent film originals.

Any suitable method of development may be employed in the system of the instant invention. Typical methods of development include: cascade development, magnetic brush development, powder cloud development, and liquid development.

Any suitable method of fixing may be employed in the system of the instant invention. Typical methods of fixing include: heat-pressure fusing, radiant fusing, combination radiant, conductive and convention fusing, cold-pressure fixing, and flash fusing.

To further define the specifics of the present invention, the following examples are intended to illustrate and not limit the particulars of the present system. Parts and percentages are by weight unless otherwise indicated.

EXAMPLE I

About 10 parts by weight of polyvinylidene fluoride resin (molecular weight 400,000; average size 5 microns), 50 parts by weight of photoconductive zinc oxide, 5 parts diisobutyl ketone, and 200 parts methanol are blended together, then mixed and kneaded in a ball mill for about 6 hours. The whitish liquid dispersion obtained is applied to the clean surface of a brass plate and then dried in an air-thermostatic oven at about 40°C. The coated plate is then heat treated in an electric oven maintained at about 240°C for about 20 miuntes. Thereafter the brass plate is removed from the oven and allowed slowly to cool in atmosphere resulting in a formation of a strong whitish coating film on the surface of the brass plate. The final coating thickness of the film is found to be 27 microns. The plate thus provided is left in the dark for 1 day and 1 night after which it is subjected to charging by a corona electrode impressed with −7 KV located at the distance of 1 cm from the plate surface. After said charging, it is found that the potential of the electrophotographic plate is −12 V. The surface of the plate is then polished and again similarly charged after which the resulting charge is measured at −510 V. A positive original is superposed on the charged electrophotographic plate and exposed to light of 5,500 luxes for 5 seconds. The plate is then developed in a conventional cascade developing system employing positively charged toners to obtain a positive image. The resulting image is an excellent reproduction of the original having good contrast and definition.

EXAMPLE II 9 parts of polyvinylidene fluoride (molecular weight 400,000; average grain size 5 microns) 8.8 parts of dimethyl phthalate, 2.2 parts of diisobutyl ketone, 30 parts fo photoconductive zinc oxide, and 120 parts of methanol are blended and dispered for about 5 minutes using a supersonic dispenser. The white liquid dispersion obtained is applied on the clean surface of a stainless steel plate and dried in an air-thermostatic oven maintained at about 40°C. The coated plate is then subjected to heat treatment in an electric oven maintained at about 280°C for a duration of about 20 minutes. A whitish film results on the surface of the plate; and after the surface is polished as in Example I, the electrophotographic plate obtained, when employed in an imaging mode as in Example I, yields excellent results.

EXAMPLE III

The procedure as outlined in Example I is again performed with the exception that an aluminized steel plate is employed instead of the brass plate resulting in an electrophotographic member which, when employed in an imaging mode, yields similar results as those obtained in Example I.

EXAMPLE IV

An electrophotographic plate is prepared as in Example I with the exception that 15 weight percent of photoconductive cadmium sulfide and 35 percent of photoconductive zinc oxide are employed instead of the 50 parts by weight of photoconductive zinc oxide. The electrophotographic plate obtained has a citrine external appearance and exhibits sensitivity to light having a wave length of up to about 550 $\mu$. When employed in an electrophotographic imaging mode, similar results to those as obtained in Example I are noted.

EXAMPLE V 20 parts of polyvinylidene fluoride (molecular weight 500,000), 80 parts of dimethylacetoamide, 60 parts of photoconductive zinc oxide, and 60 parts of methylisobutyl ketone are blended and mixed in a ball mill for about 10 hours. The liquid whitish dispersion obtained is applied to the clean surface of an aluminized steel plate dried and then heat treated as in Example I. After cooling the coated film surface is polished with polishing paper to obtain a more sensitive electrophotographic plate. The thickness of the coating of the polished plate is found to be about 35 microns. Before polishing, the plate, when charged, was found to have a surface potential in the dark of about −20 V. After polishing, the plate, when similarly charged, is found to have a surface potential of −560 V. The electrophotographic member thus provided is again similarly employed in an electrophotographic imaging process, as in Example I, with the exception that liquid development is employed with similar results obtained.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A method of providing improved electrophotographic plates comprising providing an electroconductive base, coating a mixture comprising polyvinylidene fluoride and a photoconductive powder thereover to form an electrophotographic member, said polyvinylidene fluoride having a molecular weight range of between 50,000 and 1,000,000 and said polyvinylidene fluoride and photoconductive powder being present in a ratio of photoconductive powder to polyvinylidene fluoride of from 2:1 to 6:1, drying said member prior to heat treating, heat treating said member at a temperature of from 190°C to 320°C for from 5 minutes to 2 hours, allowing said member to cool, and polishing said member.

2. The method as defined in claim 1 wherein a solvent is employed with the polyvinylidene fluoride-photoconductive powder mixture, said solvent being selected from the group consisting of dimethylacetoamide and dimethylsulfoxide.

3. The method as defined in claim 1 wherein said polyvinylidene fluoride resin is employed having an average grain size of less than about 10 microns with said photoconductive powder and a liquid, said liquid being selected from the group consisting of methanol, acetone, and diisobutyl ketone.

4. The method as defined in claim 1 wherein said conductive base comprises a material selected from the group consisting of aluminum, aluminized steel, stainless steel, and brass.

5. An improved electrophotographic imaging process comprising providing an improved electrophotographic member, said member comprising photoconductive powder in a polyvinylidene fluoride resin having a molecular weight range of between 50,000 and 1,000,000 in a ratio of photoconductive powder to polyvinylidene fluoride of from 2:1 to 6:1 coated over an electroconductive base, drying said member prior to heat treating said member at a temperature of from 190° to 320°C for a period of time from 5 minutes to 2 hours cooling said member, polishing said member, charging said member, selectively exposing said member, and developing said member.

6. A method of providing improved electrophotographic plates comprising providing an electroconductive base, coating a mixture comprising polyvinylidene fluoride and a photoconductive powder thereover to form an electrophotographic member, said polyvinylidene fluoride having a molecular weight range of between 50,000 and 1,000,000 drying said member before heat treating, heat treating said member at a temperature of between 190°C and 320°C for a period of time from 5 minutes to 2 hours said polyvinylidene fluoride being present in a ratio of photoconductor to polyvinylidene fluoride from 2:1 to about 6:1 and polishing said member.

7. The method as defined in claim 6 wherein the grain size of said polyvinylidene fluoride is less than 10 microns when employed with a poor solvent and the electrophotographic member is polished after cooling.

* * * * *

UNITED STATES PATENT OFFICE
CERTIFICATE OF CORRECTION

Patent No. 3,850,631      Dated November 26, 1974

Inventor(s) Yasuo Tamai

It is certified that error appears in the above-identified patent and that said Letters Patent are hereby corrected as shown below:

Claim 5, column 6, line 43, after "prior to" and before "heat treating" please insert --heat treating,--.

Signed and sealed this 24th day of June 1975.

(SEAL)
Attest:

RUTH C. MASON
Attesting Officer

C. MARSHALL DANN
Commissioner of Patents
and Trademarks